United States Patent
Gwyn, Jr.

[15] 3,666,160
[45] May 30, 1972

[54] METHOD AND APPARATUS FOR FEEDING DISCRETE PARTS TO A COLD HEADING MACHINE

[72] Inventor: Childress B. Gwyn, Jr., Wethersfield, Conn.

[73] Assignee: Contacts, Incorporated, Wethersfield, Conn.

[22] Filed: June 30, 1970

[21] Appl. No.: 51,290

[52] U.S. Cl..................................228/3, 10/156, 10/157, 228/49
[51] Int. Cl. ..................................B23k 21/00, B23p 3/02
[58] Field of Search.......................29/470.1; 228/3, 4, 6, 47, 228/49; 10/156, 157

[56] References Cited

UNITED STATES PATENTS

| | | | |
|---|---|---|---|
| 1,812,743 | 6/1931 | Gagnon | 10/156 |
| 1,874,678 | 8/1932 | Williams | 10/157 |
| 3,026,603 | 3/1962 | Zysk et al | 29/470.1 X |
| 3,247,533 | 4/1966 | Phipard, Jr. | 10/27 X |
| 3,359,580 | 12/1967 | Osman et al. | 10/15 X |
| 3,397,454 | 8/1968 | Gwyn, Jr. | 228/4 X |
| 3,547,334 | 12/1970 | Gwyn, Jr. | 29/470.1 X |

*Primary Examiner*—John F. Campbell
*Assistant Examiner*—Richard Bernard Lazarus
*Attorney*—Marn & Jangarathis

[57] ABSTRACT

The machine is described with reference to the production of cold bonded composite electrical contacts. A cold heading machine is altered to permit contact facing material to be fed into the coning punch assembly in discrete pieces such as balls, cylinders or the like. Ordinarily, pieces severed from a wire feed are delivered directly to the header die. In the present invention, the coning punch acts as a carrier of this material to the header die. The preferred apparatus is inherently self-timing, loading the contact facing material into the coning punch at its "rest" position. Optionally, individual body and facing components may be initially bonded as by brazing, and fed to the cold heading machine by the apparatus of the invention, eliminating wire feed and severing entirely. By virtue of the invention, facing and body components need not be of the same diameter, coning shapes are optimized, and a larger variety of heading diameters, facing thicknesses and heading ratios may be obtained. Stronger interfacial bonding is also achieved.

12 Claims, 6 Drawing Figures

INVENTOR
Childress B. Gwyn, Jr.
BY
Marn & Jangarathis
ATTORNEYS

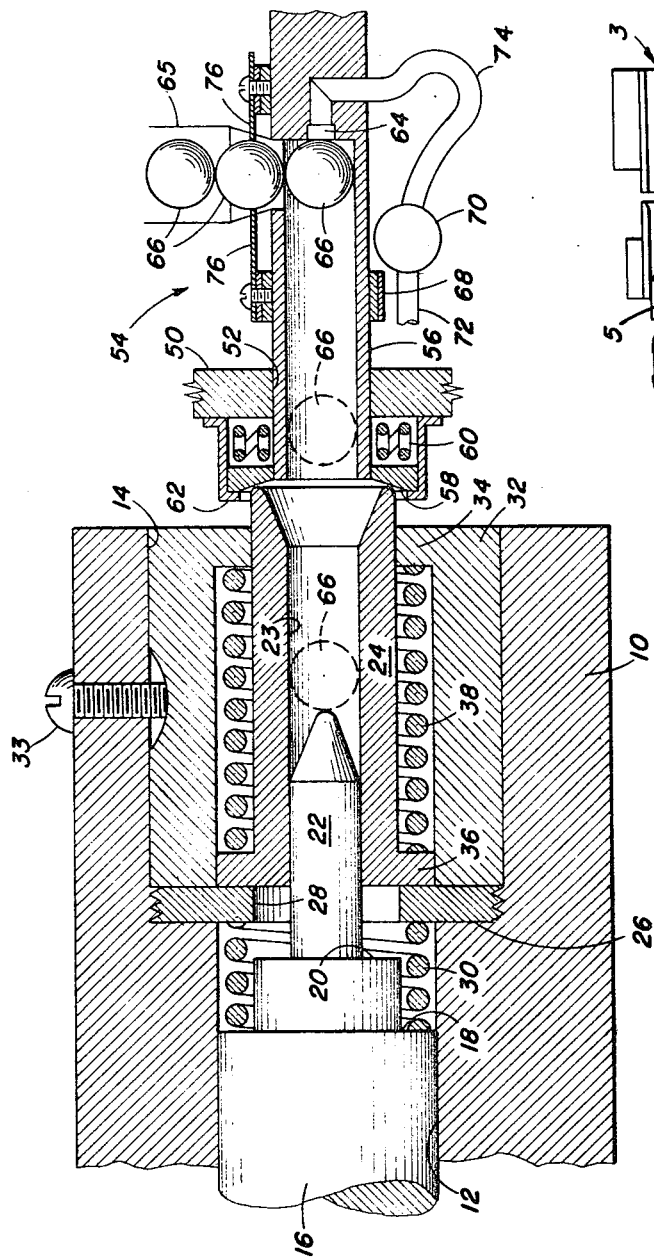
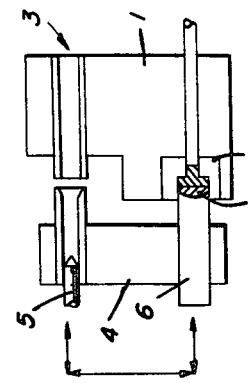
Fig. 2.
Fig. 2A
INVENTOR.
Childress B. Gwyn, Jr.

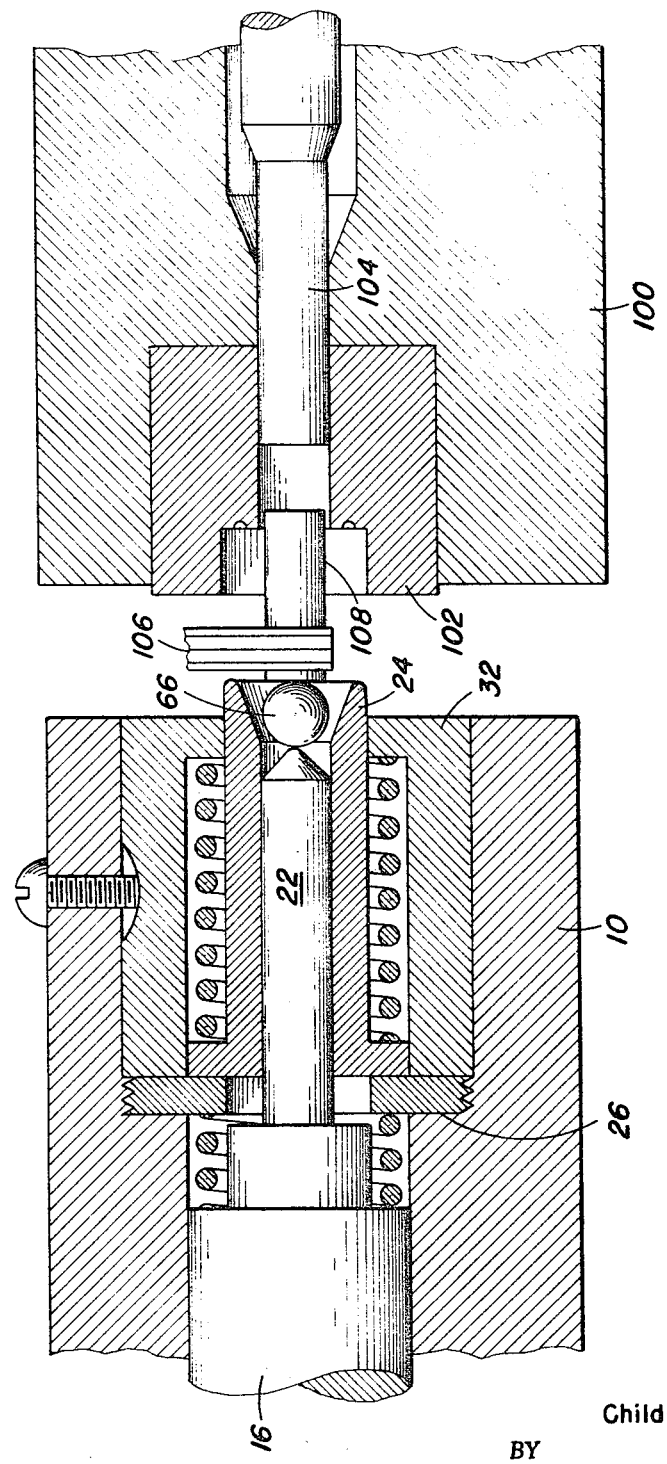

INVENTOR.
Childress B. Gwyn, Jr.
BY
Marn & Jangarathis
ATTORNEYS

METHOD AND APPARATUS FOR FEEDING DISCRETE PARTS TO A COLD HEADING MACHINE

BACKGROUND OF THE INVENTION

Prior to the development of cold bonding techniques, composite electrical contacts, e.g. contacts with a facing material such as silver and a body of copper, were produced by complex procedures involving much handling. U.S. Pats. No. 2,049,771 and 2,199,241 are illustrative. Cold heading techniques are much preferable inasmuch as the entire operation is carried out in a single machine operating at a relatively high speed. Broadly speaking, all cold heading techniques practiced heretofore involve feeding the two materials in wire form into the machine, cutting off the desired length of each material, transferring the severed wire lengths, in appropriate juxtaposition, into a die, delivering an initial coning blow to partially form the contact shape and partially bond the facing and body portions, delivering a finishing blow or blows to complete bonding and form the desired contact facing shape, and removing the finished contact from the machine.

Representative prior art patents in this area are as follows:

| Cooney | 2,739,369 |
| --- | --- |
| Zysk et al. | 3,026,603 |
| Razmus | 3,106,013 |
| Gwyn | 3,191,276 |
| Gwyn | 3,311,965 |
| Gwyn | 3,371,414 |

In the latter patent, wire feed of the facing material enters a bore in a cutter bar at a first position and is sheared by movement thereof to a second position. Wire of the body material is fed into the bore at the second position and is sheared by movement of the cutter bar to a third position. The third position is opposite a die cavity, and at this position a hammer pin enters the bore from the opposite side, driving the assembled wire segments into the die cavity and delivering the first coning blow. Additional forming blows follow, and the finished contact is ejected with a knock-out pin. As noted in this patent, if the operation is carried out rapidly enough the sheared surfaces are clean and a good bond results.

Problems associated with cold bonding operations generally involve the quality of the bond between the facing and body portions, and flow of the metal during the coning and finishing steps. A weak bond can result in early failure of the contact in service. Uneven flow of the facing and body portions often results in a weak bond, but can also affect contact resistance and other electrical properties.

An inherent limitation in the above-noted patents and in all known commercial cold heading machines is that the wire feedstocks of copper and silver (or whatever body and facing materials are employed) must be of the same diameter. While the facing thickness can be varied by controlling the length of silver wire relative to the length of copper wire sheared off, there are limits to this. Further, when starting with two cylindrical segments of the same diameter, there are limits on the diameter of the contact head which can be produced, and on the ratio between the diameter of the shank of the contact and the diameter of the head (referred to as the heading ratio). These limitations were accepted, heretofore, inasmuch as there was no known way of feeding components of different diameters into the die and retaining them therein during the initial coning blow.

The type and quality of the coning blow are largely determinative of the distribution of facing and body materials in the finished contact. With two cylindrical segments of equal diameter as starting materials, the varieties of coned shapes that can be produced are also necessarily limited.

OBJECTS OF THE INVENTION

A general object of the present invention is to provide an improved method and apparatus for cold bonding composite contacts which overcomes the foregoing limitations.

An additional object of the present invention is to provide an apparatus for feeding discrete pieces of material into the coning punch carrier of a cold heading machine, which pieces are not limited as to size or shape.

Another object of the present invention is to provide an improved method of cold bonding composite contacts which is not limited to facing and body materials of the same diameter or shape.

Still another object of the invention is to provide apparatus for producing composite electrical contacts from raw materials of differing size and/or shape which is inherently self-timing.

Yet another object of the invention is to provide apparatus for feeding discrete, preassembled parts into a cold heading machine.

Various other objects and advantages of the invention will become clear from the following description of embodiments thereof, and the novel features will be particularly pointed out in connection with the appended claims.

THE DRAWINGS

In the accompanying drawings:

FIG. 2 is a cross-sectional elevation of a coning punch assembly and loading assembly in accordance with the invention;

FIG. 2A is a simplified schematic representation of a double stroke cold header;

FIG. 3 is a cross-sectional elevation of the coning punch assembly of FIG. 2 aligned with the header die.

DESCRIPTION OF EMBODIMENTS

Figure 1:
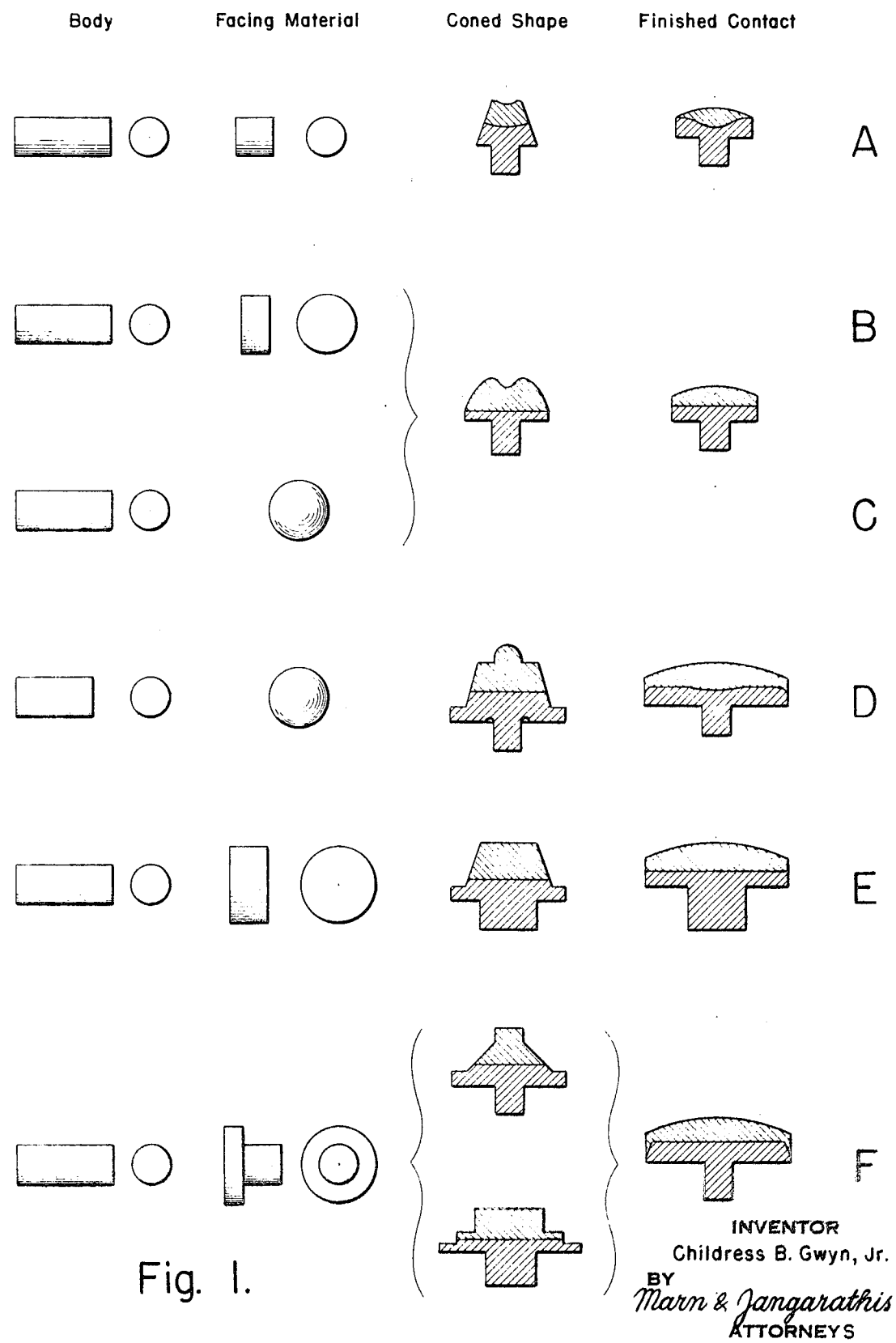
FIG. 1 is a chart illustrating how the shape and size of the facing material, and the configuration of the coning punch, can affect the size and cross-section of the finished contact.

Prior to describing the method and apparatus of the invention in detail, some attention should be directed to how the shape and size of the facing material component, and the configuration of the coning punch can be employed to affect the shape and configuration and cross-section of the finished composite contact, and attention is directed to FIG. 1. In each case, the body material is a length of severed copper wire. At A, the facing material is a cylinder of silver wire of the same diameter as the copper wire, i.e. typical of the prior art. At B and E cylinders of progressively greater diameter are employed. At C and D, spheres of the same and larger diameter, respectively, are used. Lastly, at F, a rivet shaped facing material is used. By varying the proportions of the head and shank portions, various configurations of coned shapes can be obtained. The shapes illustrated in FIG. 1 are merely representative; other shapes, for example, a double-shanked rivet, pyramidal, or the frustrum of a cone, can be used. The significant feature is that, if the shape and size of the contact facing slug can be varied within broad limits, the shape, size and cross-section of the completed composite contact can be similarly varied.

To properly understand the method and apparatus of the present invention, it is necessary to have some familiarity with cold heading machines. A solid die, double stroke header will be described. The die block is stationary, contains the die and, generally, the bores for feeding the wire or wires and associated apparatus for shearing the wires and transporting them into axial alignment with the die. The punch holder contains both the coning punch and the finishing punch, and one and then the other are moved into the die to form the contact. A knock-out pin, which forms the bottom of the shank portion of the die cavity, pushes the completed contact out of the die.

In operation, a standard roll feed mechanism advances the copper wire through the quill and up against the wire stop. A cutter knife sheares the desired length of wire (as determined by the position of the wire stop) and moves it into axial alignment with the die cavity. At the same time, the punch holder is moved by a standard gate movement until the coning punch is also in axial alignment with the die cavity, with the wire segment (or segments) therebetween. The coning punch is then actuated by a ram, pushing the segment into the die and delivering the coning blow. As the coning punch advances, the cutter bar returns to its starting position. The coning punch generally comprises a central punch and an annular sleeve, both of which advance partially into the header die, as described more fully below. It may comprise only a coning pin within a bore. The coning punch is withdrawn by the standard gate action of the header, leaving the coned (partially shaped) contact in the die. The standard gate action now moves the punch holder upward until the finish punch is in axial alignment with the die. The punch holder moves forward and a ram moves the finish punch into the die cavity, upsetting the coned contact into finished shape. The gate action now retracts the finish punch and actuates the knockout pin. The cycle now repeats with the coning punch returned to alignment with the die, together with a new segment of wire.

As the coning and finish punches are mounted on a single punch block, it will be noted that when the finish punch is advancing into the die cavity to deliver the finish blow, the coning punch is also necessarily advancing toward but not to the die block at its "rest" position. It is this forward movement of the coning punch at its rest position that is utilized in the present invention to actuate a mechanism to feed a discrete piece of contact facing material into the recessed bore of the coning punch.

The action of the coning and finishing punches are illustrated schematically in FIG. 2A. The stationary header die block 1 holds the header die 2 and the loading unit of the present invention 3. The moveable punch holder block 4 includes the coning punch 5 and the finishing punch 6. The arrows indicate generally how first the coning punch 5 and then the finishing punch 6 are brought into alignment with the header die 2 by the standard gate action. As shown in FIG. 2A, a contact 7 is receiving a finishing blow.

Reference is made to FIG. 2, which shows in cross-section a coning punch assembly on the left and the automatic part feeder mechanism on the right. The coning punch assembly is mounted in a punch holder block 10 having a punch bore 12 and, on the side facing the die, a larger sleeve bore 14. The coning punch 16 is slidably mounted in bore 12 and at its forward end has two annular shoulders 18, 20 and a hammer pin 22. The latter pin 22 fits slidably within the bore 23 of coning sleeve 24. A spacer 26 is threaded into the bottom of bore 14 and partially closes off bore 12, leaving an opening 28 therethrough. A return spring 30 is compressed between shoulder 18 of punch 16 and spacer 26 as the punch advances. Coning sleeve 24 is slidably mounted in a bushing 32 retained in bore 14 by lock and adjusting screw 33, and has an inwardly-extending annular flange 34 at its forward end. Coning sleeve 24 has an outwardly extending annular flange 36 at its rear end adjacent spacer 26. Flanges 34, 36 define the ends of an annular cavity containing the coning sleeve spring 38, which in its expanded state presses the outer portions of flange 36 of sleeve 24 against spacer 26. As coning punch 16 advances in bore 12, shoulder 20 thereon passes through opening 28 in washer 26 and abuts the inner portions of flange 36 of sleeve 24. At the same time, pin 22 passes into bore 23 of sleeve 24. From the time at which shoulder 20 and flange 36 meet, punch 16 and sleeve 24 advance together.

The foregoing describes the structure and operation of the coning punch when it is actuated and enters the die cavity. When it is at its rest position, however, punch 16 and sleeve 24 are not actuated. The entire mechanism moves toward the die block with the forward movement of the entire punch holder block, but nothing more.

The part-feeder mechanism of the invention is illustrated on the right side of FIG. 2. The embodiment illustrated is adapted to deliver spherical facing material parts into the coning punch assembly. Die block 50 has an orifice 52 therein in axial alignment with the coning punch 16 when the latter is at its rest position. Slidably fitted into orifice 52 is the feeding mechanism, generally indicated at 54. Mechanism 54 comprises a tube 56 passing through orifice 52 having, at its forward end (the end nearest the coning punch) an outwardly-extending annular flange 58. A return spring 60 forces tube 56 outward into engagement with retaining cup 62. It will be appreciated that a retaining ring on tube 56 on the inner side of die block 50, or an equivalent structure, would fulfill the same function as retaining ring 62. The surface of flange 58 nearest the coning punch is dished inwardly so as to make slidable contact with the forward edge of coning sleeve 24 when punch block 10 moves forward. The opposite end of tube 56 is closed except for an air entry port 64. On the upper side of tube 56 a feed tube 65 is provided to carry parts in any desired alignment. Of course, when the parts are spherical no alignment is necessary. Those skilled in the art will appreciate that vibratory feeders and/or other devices are capable of delivering parts into a feed tube in a predetermined alignment.

Spheres 66 fill feed tube 65 and the size (i.e., I.D.) of tube 56 is such that only one sphere 66 can be in the tube at one time; if there is no sphere 66 in tube 56, one will drop in by gravity.

A projection or pawl 68 is mounted on another side of tube 56 in a position that will cause it to engage, when the coning sleeve 24 engages flange 58 forcing tube 56 in a rear-ward direction, stationary ball type air valve 70, opening conduit 72 and allowing a compressed fluid, normally air, to pass into flexible conduit 74 communicating with orifice 64 into the interior of tube 56. The compressed air forces sphere 66 along tube 56 and into the coning sleeve 24 in the coning punch assembly. It is to be noted that a certain amount of air will escape between the forward edge of the coning sleeve and the interfacing surface of flange 58 but, so long as valve 70 is open, air pressure inside tube 56 will be sufficient to prevent any additional spheres from dropping into tube 56.

As the coning punch retracts by gate action of the punch holder block 10, return spring 60 forces flange 58 and tube 56 back against retaining cup 62 (or equivalent means) and pawl 68 releases air valve 70 back to the closed position. When the air pressure in tube 56 drops, as it will do immediately on withdrawal of coning sleeve 24 and closing of valve 70, an additional sphere 66 will drop into tube 56.

It will be appreciated that this mechaniam is entirely self-timing and requires no cams, gears or other devices in order to deliver a piece of facing material into the coning sleeve, when the coning sleeve is at its rest position. Guides 76 may be provided to allow only one sphere 66 to drop into tube 56 at a time. When it is desired to change the size of sphere 66, guides 76 are adjusted appropriately.

It will be appreciated that the opening and closing of valve 70 is of approximately the same duration as the finishing punch, a matter of a few hundredths of a second. In FIG. 2, dotted lines are used to show the positions of a sphere 66 near the open mouth of tube 56 and inside coning sleeve 24.

In this manner, a single sphere of contact facing material may be loaded into the coning-punch-carrier each time the latter is in its rest position.

Those familiar with the operation of cold heading machines will appreciate that the rapid backward movement of the coning punch assembly, as it moves away from the feeding mechanism, would tend to cause sphere 66 to roll out of bore 23 due to inertia, i.e. sphere 66 would tend to stay at rest, except for the slight frictional force tending to make it move with bore 23. This problem can be overcome in two ways, both of which increases the friction between the sphere and the bore sufficiently to insure that they move together. Bore 23 may be slightly tapered at its forward end, so that sphere 66 is forced into a strong frictional engagement therewith. Alternately, a spring detent can be provided which will retract and allow sphere 66 to pass into the bore under the force of the air blast, and will allow it to pass outwardly when pushed by coning pin 22, but will stop it from rolling out as the punch block recedes from the feeding apparatus. Either of these types of retaining means can be employed with all embodiments of the invention.

In accordance with the invention, it is possible to feed previously-joined composite parts into the header die. In instances where the axial alignment of the part as it rests in bore 23 is not the same as the header die, the latter can be champfered so as to make the part self-aligning as it enters the die. To join such composite parts, it is preferred to use the bonding method disclosed in my copending U.S. application Ser. No. 873,721, filed Nov. 3, 1969. An advantage of this method is that no brazing or soldering materials are used. An example of producing parts in this manner is a projection welding type contact. This type of contact will typically have a silver working face and a steel or copper body. Slugs of the two materials are bonded in accordance with the teachings of the above-described patent application, and fed into a cold header adapted in accordance with the present invention. Of course, care must be taken to insure that the bonded slugs arrive in bore 23 with the proper orientation, but well known equipment is capable of this function. When such pre-bonded materials are used with the invention, wire feeds, shearing etc. are eliminated entirely. The same is true, of course, where unitary parts are to be produced, as opposed to composite parts.

After a part is loaded into bore 23 of the coning assembly, standard gate action of the heading machine moves it to the rear and downward, bringing the coning punch into axial alignment with the header die, as shown in FIG. 3. Header die block 100 has header die 102 mounted therein with knock-out pin 104 forming the bottom of the shank portion of the die cavity. As the gate action brings the coning punch into alignment, wire carrier 106 brings wire slug 108 into alignment and coning pin 22 pushes sphere 66 and slug 108 into the die. Carrier 106 withdraws to its initial position as pin 22 and sleeve 24 enter the die cavity and deliver the coning blow. The punch and sleeve then withdraw, and the contact is finished in the conventional manner with the finish punch and removed by the knock-out pin.

Figure 4:
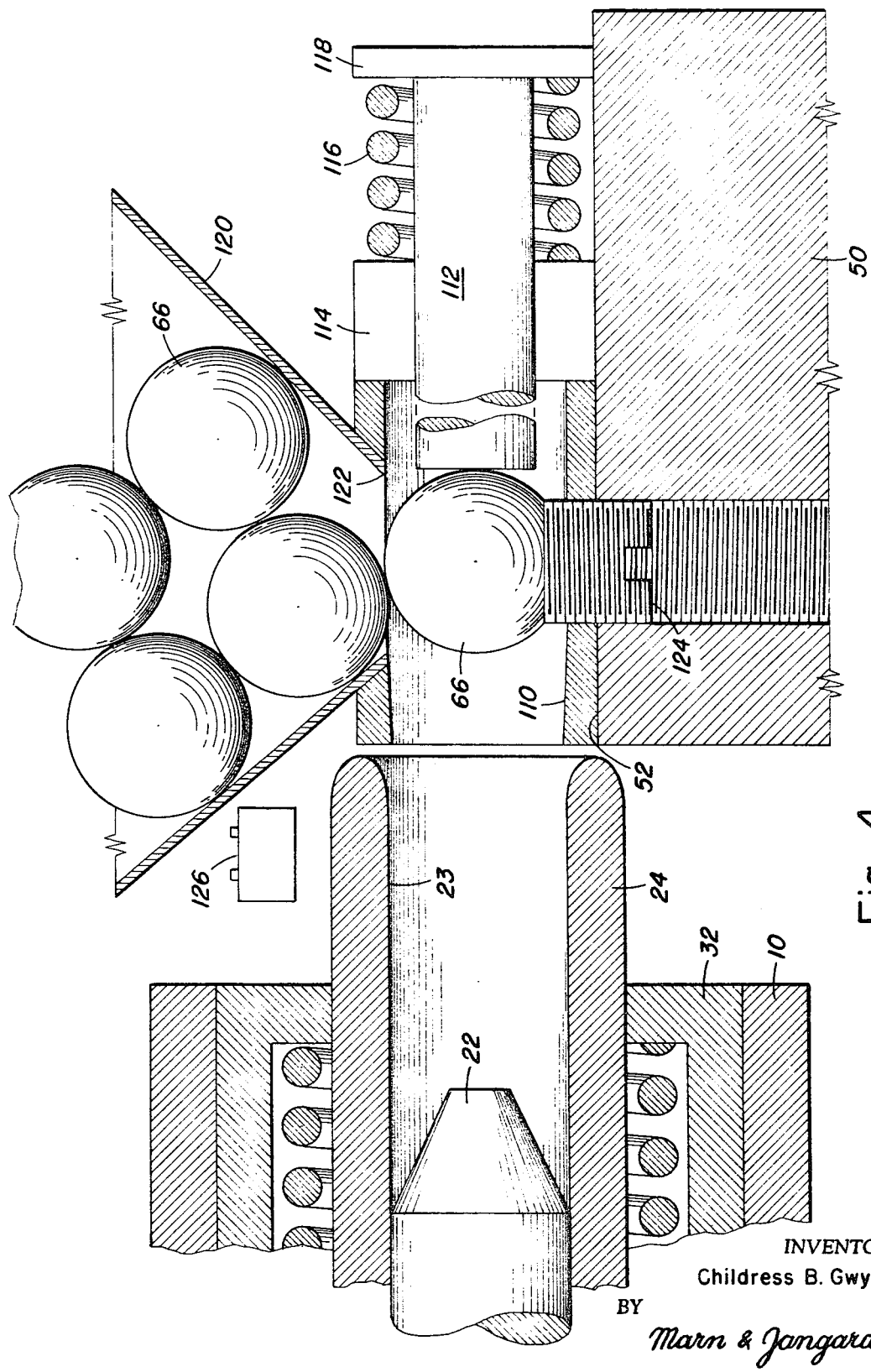
FIG. 4 and FIG. 5 are cross-sectional elevations of alternative embodiments to FIG. 2.
Figure 5:
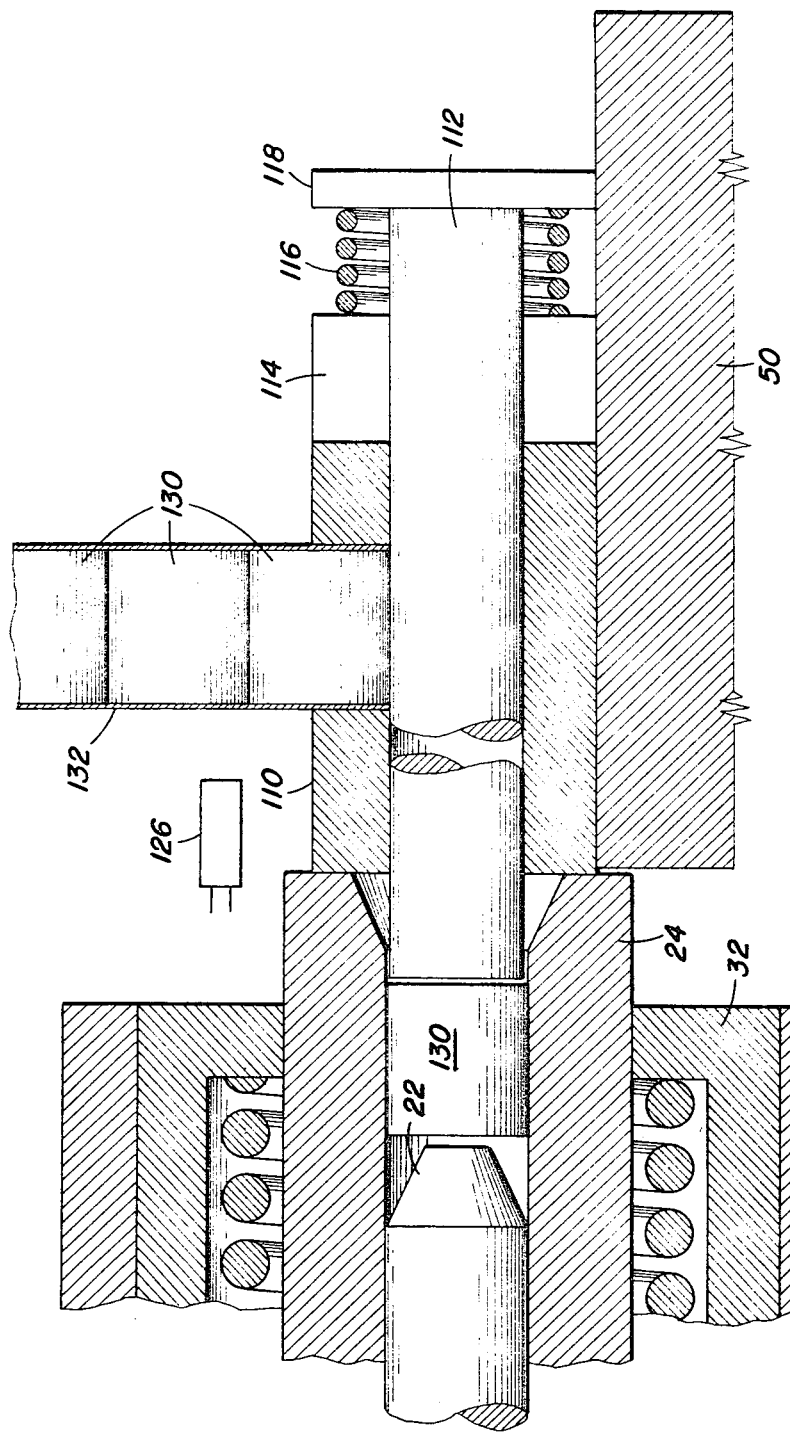

FIGS. 4 and 5 illustrate alternative embodiments of feeding apparatus similar to FIG. 2, but wherein a plunger or piston pushes the part into the coning punch carrier. Again, similar parts are indicated with similar reference numerals.

In the embodiment of FIG. 4, the header die block 50 is provided with an opening 52 in axial registration with the coning punch assembly at its rest position. Opening 52 is provided with a tube 110 open in the front and having at the opposed end a piston or plunger 112 actuated by a solenoid 114. A return spring 116 fits between solenoid 114 and an annular flange or collar 118 at the rear of piston 112, and acts to return piston 112 to its normal position. A feed bin 120 contains spheres 66 and has an opening 122 at its lower end into the top of tube 110 big enough to allow passage of one sphere 66 at a time. Directly below opening 122 an adjustable set screw 124 is threaded into the bottom of tube 110 and has a spherically indented top surface adapted to retain a single sphere 66 therein. As the coning punch assembly moves forward at its top rest position, a sensing relay 126 closes due to permeation of its magnetic field by the tip of coning sleeve 24. A microswitch could also be employed. This actuates solenoid 114 driving piston 112 through tube 110, pushing sphere 66 into bore 23 of coning sleeve 24. While piston 112 is in the extended position, it prevents other spheres 66 from entering tube 110. As the coning punch retracts relay 126 opens, solenoid 114 is switched off, and return spring 116 retracts piston 112, allowing another sphere 66 to enter tube 110.

The embodiment of FIG. 5 is similar to that of FIG. 4, but is adapted to feed cylindrical slugs 130 into the coning punch carrier rather than spheres. The piston, solenoid and sensing relay structures are the same, except in this embodiment it is convenient to have piston 112 approximately the diameter of tube 110. A feed tube or magazine 132 feeds slugs 130 into tube 110 in proper orientation, and piston 112 forces it into coning sleeve 24 on actuation, as shown.

It is to be noted that solenoid units are available with a 1.5 inch stroke and a piston force of 90 p.s.i. This is more than adequate for the present invention.

It will be appreciated that in certain instances where the desired proportion of facing material to body material is large, it may be more economical to load two smaller discrete parts of facing material into the coning punch-carrier than one larger part. Economies would result in not having to tool up to produce the larger part and/or replace an existing feed mechanism. This can be accomplished by merely providing two feed tubes instead of one in any of the foregoing embodiments. Such an arrangement could also be used to produce tri-metallic parts. For example, electrical contacts of the projection-welding type may have a silver facing, a copper body and a steel or Monel backing.

It has been determined that composite rivet type contacts made in accordance with this invention are bonded over +95 percent of the interfacial area, an improvement over contacts produced by prior methods. It has also been determined that with the present invention, where both parts need not be of the same diameter, diameters and heading ratios beyond the rated maximum of the machine can be achieved. Rivets of 4.5 diameters at 0.250 inch have been produced on a machine having a tonnage rated maximum of 4 diameters at 0.187 inch.

It is to understood that while the invention has been described with primary reference to producing composite contacts, it is not so limited, and can be utilized in essentially any cold heading operation. Further, shapes other than spheres and cylinders are readily accommodated and may be kept aligned by appropriate shaping of the feed tubes or magazines. Also, the invention is obviously applicable to coning punches not having relatively moveable coning sleeves.

Various other changes in the details, steps, materials and arrangements of parts, which have been herein described and illustrated in order to explain the nature of the invention, may be made by those skilled in the art within the principle and scope of the invention, as defined in the appended claims and their equivalents.

I claim:

1. A cold heading machine comprising:
   a stationary header die block having a header die in one face thereof;
   a moveable punch holder block having a coning punch and a finish punch in a face thereof opposed to said header die block, said coning punch including a relatively moveable coning pin within an annular bore;
   means for moving said punches into axial alignment with said header die one after the other, means for moving said punch holder block toward and away from said die block, and means for moving said punches into said header die to deliver respective coning and finishing blows, each said punch having a rest position when the other said punch is in alignment with said header die;
   feeding means adapted to feed at least one discrete part to be cold headed into said bore when said coning punch is at its rest position, said feeding means being actuated by movement of said punch holder block toward said die block; said feeding means comprising:
   loading tube means mounted in said header die block in axial alignment with said coning punch at its rest position;
   means for feeding one discrete part at a time into said loading tube;
   control means actuated by approach of said bore toward said tube means; and
   transport means responsive to said control means for forcing said discrete part from said tube means into said bore.

2. The cold heading machine as claimed in claim 1, and additionally comprising retaining means mounted in said coning sleeve and adapted to retain said discrete part within said coning sleeve during movement of said punch holder block away from said header die block.

3. The cold heading machine as claimed in claim 1, wherein said transport means comprises a supply of a compressed fluid communicating with said loading tube means through a conduit, and said control means comprises a valve in said conduit.

4. The cold heading machine as claimed in claim 1, wherein said transport means comprises a piston within said loading tube means, and said control means comprises a solenoid.

5. The cold heading machine as claimed in claim 1 wherein said feeding means comprises a vertical feed tube, said loading tube having an inside cross-section capable of holding only one of said discrete parts.

6. The cold heading machine as claimed in claim 1, wherein a switch is provided to actuate said control means, said switch being closed by forward movement of said punch holder block.

7. The cold heading machine as claimed in claim 2, wherein said retaining means comprises a slight taper in said bore, said discrete part being held therein by frictional engagement.

8. The cold heading machine as claimed in claim 2, wherein said retaining means comprises a spring detent.

9. The cold heading machine as claimed in claim 3, wherein said loading tube extends beyond the face of said die block and is movable along its axis when pushed by the forward movement and said valve is opened by a pawl mounted on said loading tube.

10. The cold heading machine as claimed in claim 1, and additionally comprising a relatively movable coning punch sleeve annular to said coning pin and defining said bore.

11. The cold heading machine as claimed in claim 1, wherein two of said means for feeding a discrete part are provided.

12. The cold heading machine as claimed in claim 5, wherein two vertical feed tubes provided, each providing a discrete part to said loading tube, whereby two discrete parts are forced into said bore by said transport means.

* * * * *